United States Patent
Gee et al.

(10) Patent No.: US 6,749,345 B1
(45) Date of Patent: Jun. 15, 2004

(54) APPARATUS AND METHOD FOR ELECTRO-OPTICAL PACKAGES THAT FACILITATE THE COUPLING OF OPTICAL CABLES TO PRINTED CIRCUIT BOARDS

(75) Inventors: Stephen Andrew Gee, Danville, CA (US); Luu Thanh Nguyen, Sunnyvale, CA (US); Ken Pham, San Jose, CA (US); Jia Liu, San Jose, CA (US); William Paul Mazotti, San Martin, CA (US); Bruce Carlton Roberts, San Jose, CA (US); Peter Deane, Los Altos, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 25 days.

(21) Appl. No.: 10/155,743

(22) Filed: May 24, 2002

(51) Int. Cl.$^7$ .................................................. G02B 6/38
(52) U.S. Cl. ........................................................ 385/75
(58) Field of Search .......................... 385/75, 89, 98–99, 385/45, 52, 33, 49, 55, 135, 56–57, 62, 69, 83, 85, 88, 91

(56) References Cited

U.S. PATENT DOCUMENTS

| | | | | |
|---|---|---|---|---|
| 5,675,685 A | * | 10/1997 | Fukuda et al. ................ | 385/89 |
| 5,838,357 A | * | 11/1998 | Maslanka et al. ............ | 347/215 |
| 5,852,257 A | * | 12/1998 | Dittman et al. .............. | 174/59 |
| 5,972,232 A | * | 10/1999 | Lee et al. ..................... | 216/24 |
| 6,222,665 B1 | * | 4/2001 | Neuner et al. .............. | 359/245 |
| 6,375,362 B1 | * | 4/2002 | Heiles et al. ................. | 385/75 |

OTHER PUBLICATIONS

"Form Factor's Wafer–Level Packaging and Whole–Wafer Test Technologies", Printed from www.formfactor.com on Mar. 20, 2002.
"Form Factor Introduces an Integrated Process for Wafer–Level Packing, Burn–in Test and Module Level Assembly", IEEE/IMAPS International Symposium on Advanced Packaging Materials, Mar. 1990.
"Integrated Fober Optic Transmitters and Receivers for SONET/ATM Applications", Tran V. Muoi, IEEE 1995, pp 1092–1095.
"Multigigabit Multichannel Optical Interconnection Modules for Asynchronous Transfer Mode Switching Systems", Arai et al, IEEE 1995, pp 558–564.
"Silicon Waferboard–Based Single–Mode Optical Fiber Interconnects", Haugsjaa et al., IEEE 1996, pp 90–97.
NEC Laser Array.
NTT Self–Aligned Assembly.
"40G Parallel Optical Modules", Corona Optical Systems, www.coronasys.com.

* cited by examiner

Primary Examiner—Jean F. Duverne
(74) Attorney, Agent, or Firm—Beyer Weaver & Thomas LLP (57) ABSTRACT

Electro-optical packages that embed the electronics of the packages directly to the optical cabling, provide short electrical connection paths for high performance, and that provide a robust interconnects. A first electro-optical package includes an integrated circuit and a connector sleeve configured to receive a plug-in optical assembly from the underside of the PC board. The plug-in optical assembly includes a backing piece and an opto-electric device mounted onto the backing piece. An electrical connection is provided between the opto-electric device and a contact location on the backing piece and a contact is provided between the contact location on the backing piece and the integrated circuit. With a second electro-optical package, an integrated circuit having an active surface facing in a first direction and an opto-electric device having contact points facing a second direction are provided. The integrated circuit and the opto-electric are positioned with respect to one another such that a direct electrical connection can be formed between the active surface of the integrated circuit and the contact points of the opto-electrical device.

30 Claims, 6 Drawing Sheets

APPARATUS AND METHOD FOR ELECTRO-OPTICAL PACKAGES THAT FACILITATE THE COUPLING OF OPTICAL CABLES TO PRINTED CIRCUIT BOARDS

FIELD OF THE INVENTION

The present invention relates generally to electro-optical couplers, and more particularly, to various electro-optical packages that facilitate the coupling of optical cables to printed circuit boards.

BACKGROUND OF THE INVENTION

With advances in optical technologies, such as Wave Division Multiplexing (WDM), more and more computer and communication networks are being built using fiber optic cables. With WDM for example, multiple optical signals, each at different wavelengths, are used to simultaneously transmit multiple communication channels across a single optical fiber. To further increase bandwidth, multiple fibers may also be employed. While fiber optics have significantly increased the broadband capabilities of communication networks, much of the signal processing at nodes of the network is still performed in the electrical domain using integrated circuits. Thus electro-optical couplers, which convert optical signals into electrical signals and vice versa, have been used at the interface between the optical cables and the nodes.

A typical electro-optical coupler includes a connector for receiving an optical fiber and a housing which houses a photonic device. The photonic device is usually mounted onto a substrate. A ferrule included in the housing is used to align the optical fiber with the photonic device. Electrical traces and contacts provided on the substrate are used to electrically connect the coupler to the outside world, typically a printed circuit board. One of the major hurdles in manufacturing these electro-optical couplers is the proper alignment of the fiber to the optically sensitive components on the opto-electric (i.e., photonic) device. Also during solder reflow to attach the coupler to the printed circuit board, it is possible for the photonic device to become mis-aligned with the fiber due to mismatches of thermal expansion of the materials used to hold the fiber and the photonic device in place. Contamination at the termination of the fiber the coupler may also occur during mounting onto a printed circuit board. See for example, "Integrated Fiber Optic Transmitters and Receivers for SONET/ATM Applications,", T. Muoi, Electronics Components and Technology Conference 1995 Proceedings, p. 1092.

Another type of connector for high density applications involves the use of a substrate that is etched to provide grooves to accommodate multiple fibers. See for example, Silicon Waferboard Based Single Mode Optical Fiber Interconnects," P. Haugsjaa, G. Duchene, J. Mehr, A. Negri And M. Tabasky, IEEE Transactions On Components, Packaging and Manufacturing Technology—Part B, Vol. 19, No. 1, Feburary 1996. With this type of connector, multiple devices, typically either transmitters or receivers, are mounted onto the substrate. The grooves are used to align the individual fibers with either the photo-transmitting or receiving regions on the devices. Separate bond pads coupled to each of the devices are also provided on the substrate to couple the devices to external components, such as another chip or a printed circuit board. While this type of connector is useful for high density applications, they are expensive to produce and lack the reliability required in order to provide a reliable "last-mile" optical interconnect to the end user.

In general, current connection methods are typically designed around plug-in connections along the optical pathway. This means that low reliability optical components on the board side of the connector must be able to survive electronics soldering environments without contamination to sensitive optical surfaces. Additionally, the requirement on optical alignment are orders of magnitude more restrictive than those for plug-in electrical connections.

Electro-optical packages that embed the electronics of the packages directly to the optical cabling, provide short electrical connection paths for high performance, and that provide a robust interconnect are therefore needed.

SUMMARY OF THE INVENTION

To achieve the foregoing, and in accordance with the purpose of the present invention, electro-optical packages that facilitate the coupling of optical cables to printed circuit boards are disclosed. A first electro-optical package includes an integrated circuit and a connector sleeve configured to receive a plug-in optical assembly. The plug-in optical assembly includes a backing piece and an opto-electric device mounted onto the backing piece. An electrical connection is provided between the opto-electric device and a contact location on the backing piece and a contact is provided between the contact location on the backing piece and the integrated circuit. The connector sleeve of first electro-optical package enables the optical assembly to be "plugged" into the package. The plug-in fiber optic assembly provides a number of advantages, including the easy removal for inspection or replacement of the assembly, and protection from contaminants during board population and assembly. With a second electro-optical package, an integrated circuit having an active surface facing in a first direction and an opto-electric device having contact points facing a second direction are provided. The integrated circuit and the opto-electric device are positioned with respect to one another such that a direct electrical connection can be formed between the active surface of the integrated circuit and the contact points of the opto-electrical device. This second embodiment thus provides an extremely short electrical signal paths between the integrated circuit and the opto-electric device.

BRIEF DESCRIPTION OF THE DRAWINGS

The invention, together with further advantages thereof, may best be understood by reference to the following description taken in conjunction with the accompanying drawings in which.

In the Figures, like reference numbers refer to like components and elements.

DETAILED DESCRIPTION OF THE INVENTION

Figure 1:
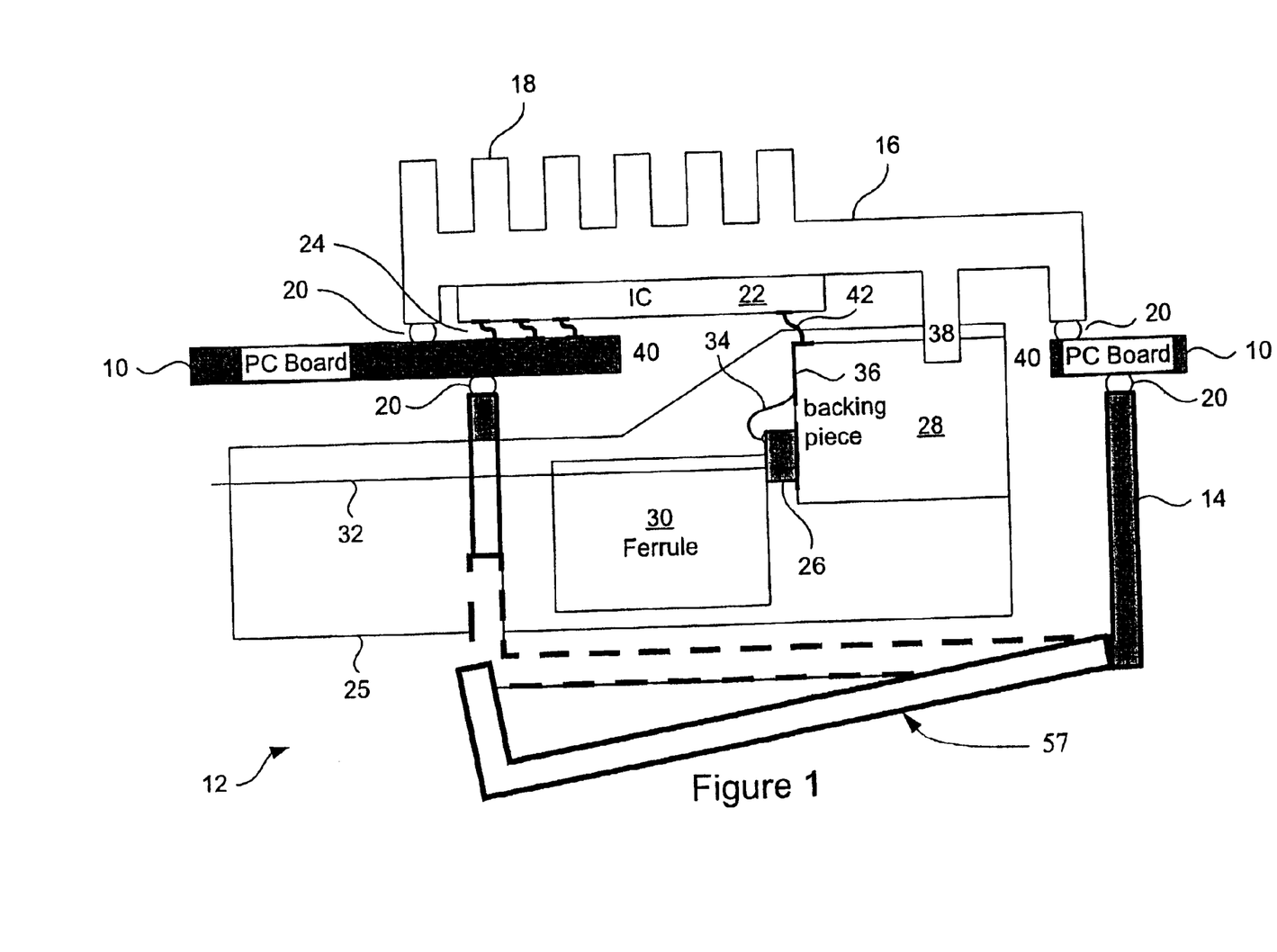
FIG. 1 is a cross section diagram of an electro-optical package that facilitate the coupling of optical cables to a printed circuit board according to one embodiment of the present invention.

Referring to FIG. 1, a cross section diagram of an electro-optical package that facilitates the coupling of optical cables to a printed circuit board 10 according to one embodiment of the present invention is shown. The electro-optical package 12 includes a bottom connector sleeve 14 and a top shield 16.

In the embodiment shown, the shield 16 is configured as a beat sink made of a thermally conductive material such as metal with heat dissipating fins 18. In alternative embodiments, the shield 16 can be made of other suitably conductively coated or filled epoxy, plastic or ceramic materials. Fastening elements 20, such as solder, screws or epoxy, are used to align and secure the bottom sleeve 14 and the top shield 16 to the printed circuit board 10. An integrated circuit (IC) chip 22 is precision mounted onto the undersurface of the top shield 16. The chip 22 is connected to the printed circuit board using contacts 24. The contacts 24 can be any one of a number of different types of contacts, such as solder balls or micro-springs. For a more detailed explanation of micro-springs, see IEEE/MAPS, International Symposium on Advanced Packaging Materials, March 1999 and Microspring Contact On Silicon Technology (MOST™) from FormFactor, Inc., Livermore Calif. (FormFactor's Wafer-Level Packaging and Whole-Wafer Test Technologies paper), incorporated by reference herein for all purposes.

The sleeve 14 is designed to guide the probe pads on an optical sub-assembly 25 into alignment with the electrical probe tips 42 on the IC chip 22. The optical sub-assembly 25 includes an opto-electric device 26 mounted onto a backing piece 28, and a ferrule 30 configured to align a fiber optic ribbon cable 32 with the optical components on the opto-electric device 26. Wire bonds 34 and traces 36 electrically couple opto-electric device 26 and the top surface of the backing piece 22. In one embodiment of the invention, the sleeve 14 includes a latch 57 that is mounted to rotate about the bottom of the sleeve 14. The latch 57 latches the optical sub-assembly 25 in place.

An alignment pin(s) 38 extending from the shield 16 through a recess region or hole 40 in the printed circuit board 10 is inserted into an alignment receptacle of the backing piece 28. The alignment pin 38 maintains the backing piece 28 in proper alignment so that electrical contact(s) 42 can be aligned and maintained between the chip 22 and the backing piece 28. According to various embodiments of the invention, the electrical connections 42 can include mechanical contact between solder balls (or metallized pads) and electrical probes (such as microsprings, crown, pogo pin or cobra probes, etc). The optical sub-assembly 25 may include a fiber optic ribbon cable 32 with one or more fiber(s), opto-electric device(s) 26, and contact(s) (or probes) 42. According to yet other embodiments, the chip 22 can be any type of communications chip, such as a receiver, a transmitter or a transceiver. Similarly, the opto-electric device 26 can either receive optical signals and convert them to electric signals (i.e., a photodetector), receive electrical signals from chip 22 and convert them into optical signals (i.e., a laser diode), or both. Also the chip 22 and the opto-electric device 26 can be fabricated on silicon, galium arsenide, or on any other type of semiconductor material. Finally, the bottom connector sleeve 14 can be made of a number of materials, such as metal filled or conductively coated plastic, epoxy, ceramic, or a thermally conductive material such as metal.

Figure 2A:
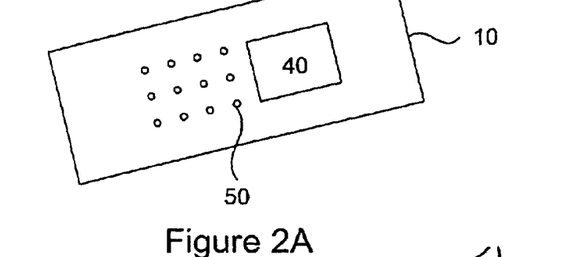
FIGS. 2A through 2E are various views of the package of FIG. 1 during assembly according to the present invention.
Figure 2B:
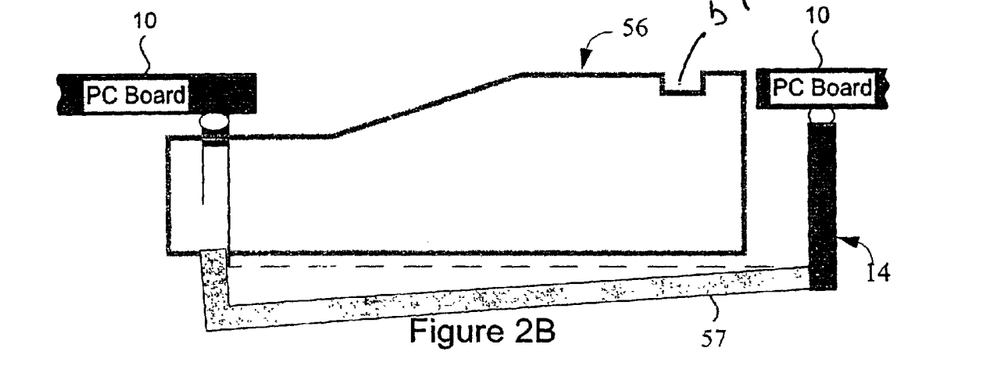

Referring to FIGS. 2A through 2E, various views of the package 12 of FIG. 1 during assembly and mounting onto the printed circuit board 10 is shown. FIG. 2A shows the printed circuit board 10 with contacts 50 formed thereon and the hole region 40. The contacts 50 are provided to mate with the contacts 24 of the chip 22 when it is mounted on the printed circuit board 10. The hole region 40 is provided to accommodate the package 12 when it is mounted on the printed circuit board 10. In the initial step, the bottom connector sleeve 14 is attached to the printed circuit board 10 as illustrated in FIG. 2B. This bottom connector sleeve 14 is reflow soldered, then epoxy glued in place, to avoid movement during subsequent reflow solder operations. Next, a disposable alignment block 56, matching the outer dimensions of the optical sub-assembly 25, is plugged into the bottom connector sleeve 14. The purpose of this alignment block 56 is to align the top shield 14 and chip 22 with respect to the alignment block 56. Specifically, the disposable alignment block 56 has a receptacle 51 that mates with the guide pin(s) 38 on the top shield 16. The guide pin(s) 38 facilitate the mechanical alignment of the electrical contact 42, between the chip 22 and the backing piece 28, when the optical sub-assembly 25 is later inserted into the sleeve 14.

Figure 2C:
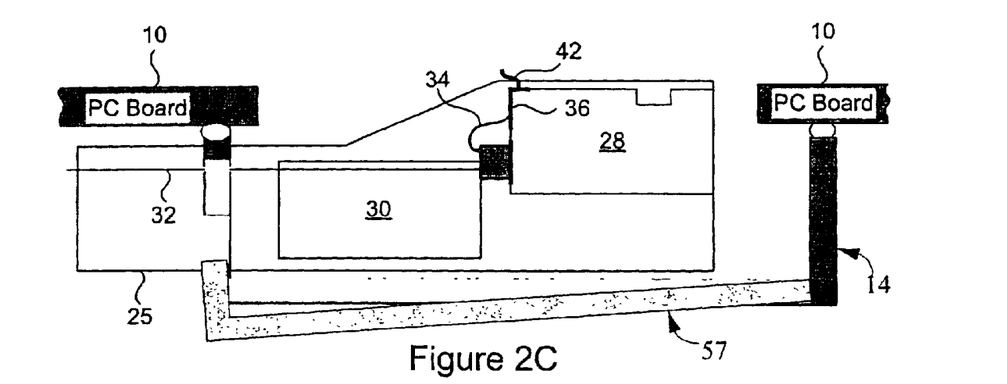
Figure 2D:
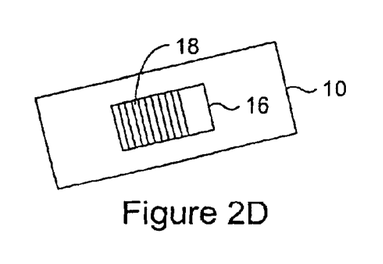
Figure 2E:
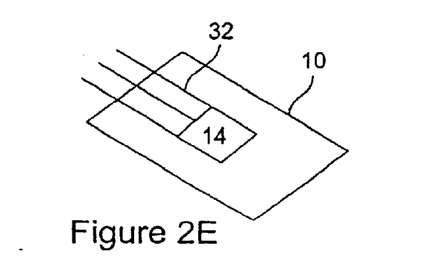

After alignment, the shield 16 and chip 22 are permanently attached in place on the PC board 10. The alignment block 56 is removed and the optical sub-assembly 25 is now ready for insertion into the sleeve 14. The optical sub-assembly 25 including the fiber optic ribbon cable 32, the backing piece 28, opto-electric device(s) 26, and the ferrule 30 are inserted into the bottom connector sleeve 14 as illustrated in FIG. 2C. As noted above, the contacts of the chip 22 are aligned with the contacts 50 on the printed circuit board 10. Also the alignment pin(s) 38 of the top shield 16 extends through the hole region 40 and is designed to mate with the backing piece 28. This provides for precision alignment of the electrical contact(s) 42 between the chip 22 and the backing piece 28. Finally, in FIGS. 2D and 2E, a top perspective view and a bottom perspective view of the printed circuit board 10 with the electro-optical package 12 mounted thereon are respectively shown. FIG. 2D illustrates the shield 16 and fins 18 mounted onto the printed circuit board 10. FIG. 2E illustrates multiple optical fibers of the fiber optic ribbon cable 32 provided to the electro-optical package 12.

The package 12 provides a number of advantages. The shield 16 provides both electrical shielding and heat dissipation for the package 12. The alignment pin(s) 38 ensures the proper alignment of the components in the optical sub-assembly 25 including the contact(s) 42 between the backing piece 28 and chip 22. Similarly, the fasteners 20 provide proper alignment of the connector sleeve 14 to the printed circuit board 10. The sleeve 14 also provides for electrical shielding, heat dissipation, and provides a latch 57 to guide and latch the backing piece 36 onto the alignment pins 38, thereby securing the desired electrical contacts 42.

Figure 3:
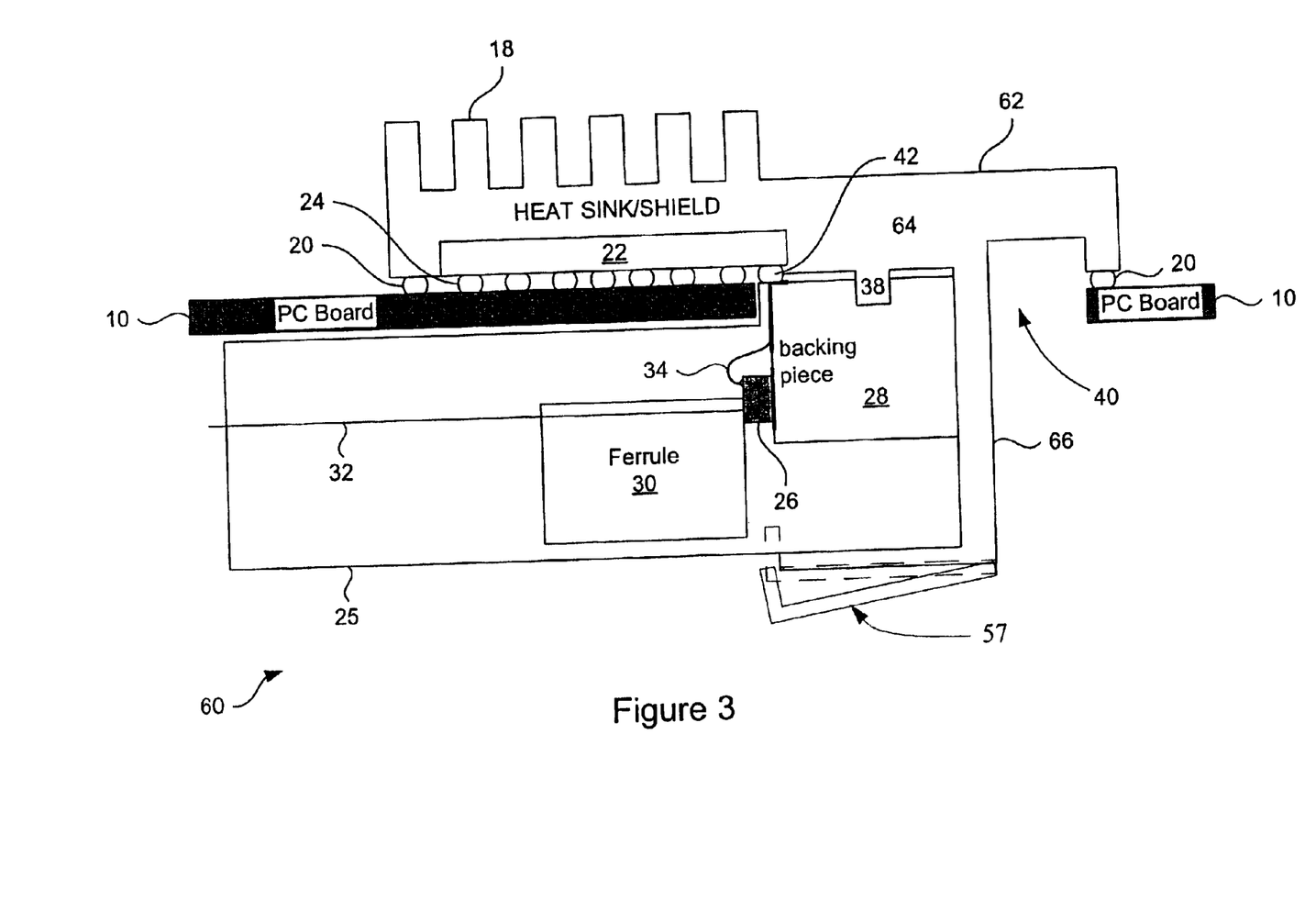
FIG. 3 is a cross section of another electro-mechanical package according to another embodiment of the present invention.

FIG. 3 is a cross section of another opto-electronic package 60 according to another embodiment of the present invention. With this embodiment, the bottom connector sleeve 14 and the top shield 16 are replaced by a integral package structure 62 that includes a top component 64 and a bottom component 66. The top component 64 includes an IC chip 22 precision mounted onto its undersurface. The chip 22 is connected to the printed circuit board through contacts 24. The bottom component 66 is configured as a connector receptacle designed to pass through the hole region 40 and to extend through the bottom surface of the printed circuit board 10. The bottom component 66 is configured to accommodate the plug-in optical sub-assembly 25 which includes a photonic device 26, a backing piece 28, ferrule 30, fiber ribbon cable 32, etc. Contact(s) 42 are provided between the backing piece 28 and the chip 22. Although the contact(s) 24 and contact(s) 42 are illustrated as solder balls in this figure, they too may be any type of electrical contact such as micro-springs, bond pads or any other type of micro miniature probe connection. Like components with the same reference numerals as described above perform the same or similar functions with regard to package 60 of FIG. 3 and are therefore not described in detail herein.

Prior to mounting the package 60 onto the printed circuit board 10, the chip 22 is precision mounted onto the undersurface of the top component 64. The bottom component 66 is then inserted through the hole region 40 and mounted onto the printed circuit board 10 using fastening elements 20. The optical sub-assembly 25 including the backing piece 28, ferrule 30, and the fiber ribbon cable 32 is then inserted into the bottom component 66 and secured with the latch 57. The bottom component 66 guides the optical sub-assembly 25 into the mounting package 60 such that pin(s) 38 precisely align the backing piece 28 and the contact(s) 42 of the chip 22. The latch 57 of the bottom component 66 latches or locks the optical sub-assembly 25 in place after alignment. The top component 64 also provides heat dissipation and electrical shielding. It is also should be noted that in various embodiments of the invention as provided in FIGS. 1 and 3, the alignment pin(s) 38 do not necessarily need to be pin shaped. Rather the term "pin" as used in the present application is intended to cover channels, ridges rounded cones or any other type of mating elements.

The packages 12 and 60 thus provide physical separation between the photonic and electrical sub-assemblies. The optical sub-assembly 25 is in essence a plug-in unit. The two chips 22 and 26 are mounted at 90 degree angles to one another and the backing piece 28 is used for space transformation of the electrical contacts between the two chips.

Figure 4:
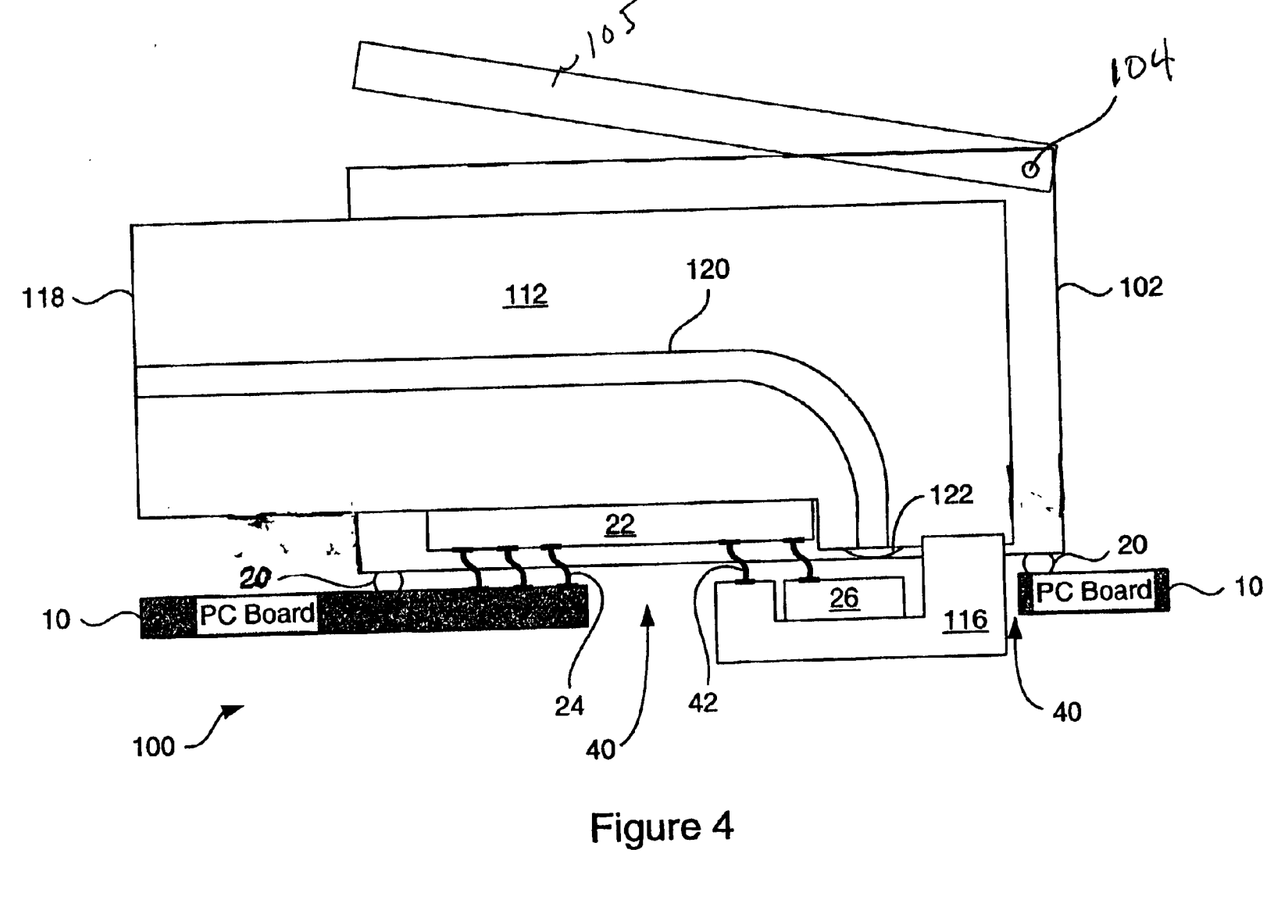
FIG. 4 is a cross section of another electro-mechanical package which includes a receptacle to house an opto-electronic device that connects directly to a PC board according to the present invention.

FIG. 4 shows the cross section of another electro-optical package 100 which is composed of two major components: (i) a cable receptacle 102 which is permanently soldered to the PC Board 10; and (ii) an optical cable housing 112. All the active opto-electronic functions are embedded within the optical cable housing 112, including an upper assembly 118 which houses the fiber optics 120 and lens array 122 and a lower subassembly 116 which includes opto-electronic chip 26.

Prior to insertion into the cable receptacle 102, the optical cable housing 112 is assembled. The opto-electronic chip 26 is first precision bonded to the lower cable assembly 116. The chip 22 is precision mounted onto the underside of the optical cable housing 118. Thereafter, the lower assembly 116 is permanently bonded to the upper cable assembly 118 so as to achieve alignment of the electrical contacts 42 between the photonic chip 26 and the IC chip 22. During the bonding procedure, the photonics chip 26 is also aligned with the fiber optic lens array 122. The connections 42 between the IC chip 22 and the photonic chip 26 can be solder balls, micro-springs or any other type of electrical connection as described above.

A latch 105 provided at the top of receptacle 102 rotates about a compliant hinge 104. To insert the fiber optic assembly 112, the top of the receptacle 102 is lifted and the fiber optic assembly 112 is inserted through the openings on the top and left side of the receptacle 102. The cable receptacle 102 is designed with precision guidance features to guide the fiber optic assembly 112 into the receptacle 102 to ensure that the electric contact 24 between the IC Chip 22 and metallized pads on the printed circuit board 10 are aligned According to various embodiments of the invention, the electrical contacts 24 can be micro-spring, solder balls or any other type of contact. After insertion, the compliance force of the latch 105 and hinge 104 provides a sufficient compressive force on the fiber optic assembly 112 to provide "scrub" contact between the contacts 24 and the printed circuit board 10.

In various embodiments of the invention, the upper 118 and lower 116 cable assemblies is made of a thermal and electrically conductive material such as metal, or other types of conductively coated or metal filled plastics, ceramics, or epoxies materials. The cable receptacle 102 may be made on insulative plastic, but if added thermal conductivity or electrical shielding is required, it may be made of the aforementioned thermal/electrically conductive materials. Fastening elements 20, such as solder balls, screws, bolts or epoxies, may be used to mount the receptacle 102 to the printed circuit board 10 which includes a recess region or hole 40 to allow for clearance of the backing piece 116.

The fiber optic assembly 112 includes a photonic sub-assembly 116, which includes opto-electric device 26, located adjacent the lens array 122 where the fiber optic cable 120 terminates. The photonic assembly 116 is rigidly attached to the cable assembly 112. With the embodiment shown, the fiber optic cable 120 has a radius bend and terminates at lens array 122. In alternative embodiments, a lower profile, mirror surfaced, SPF arrays (Slant Polished Fibers) may also be used in place of the lens array 122. See for example, "Multigigabit Multichannel Optical Interconnection Modules for Asynchronous Transfer Mode Switching Systems", Y. Ari, H. Takahara, K. Koyabu, S. Fujita, Y. Akahori, and J Nishikido, IEEE Transactions on Components, Packaging, and Manufacturing Technology-Part B, Vol. 18, No. 3, Aug. 95).

Figure 5:
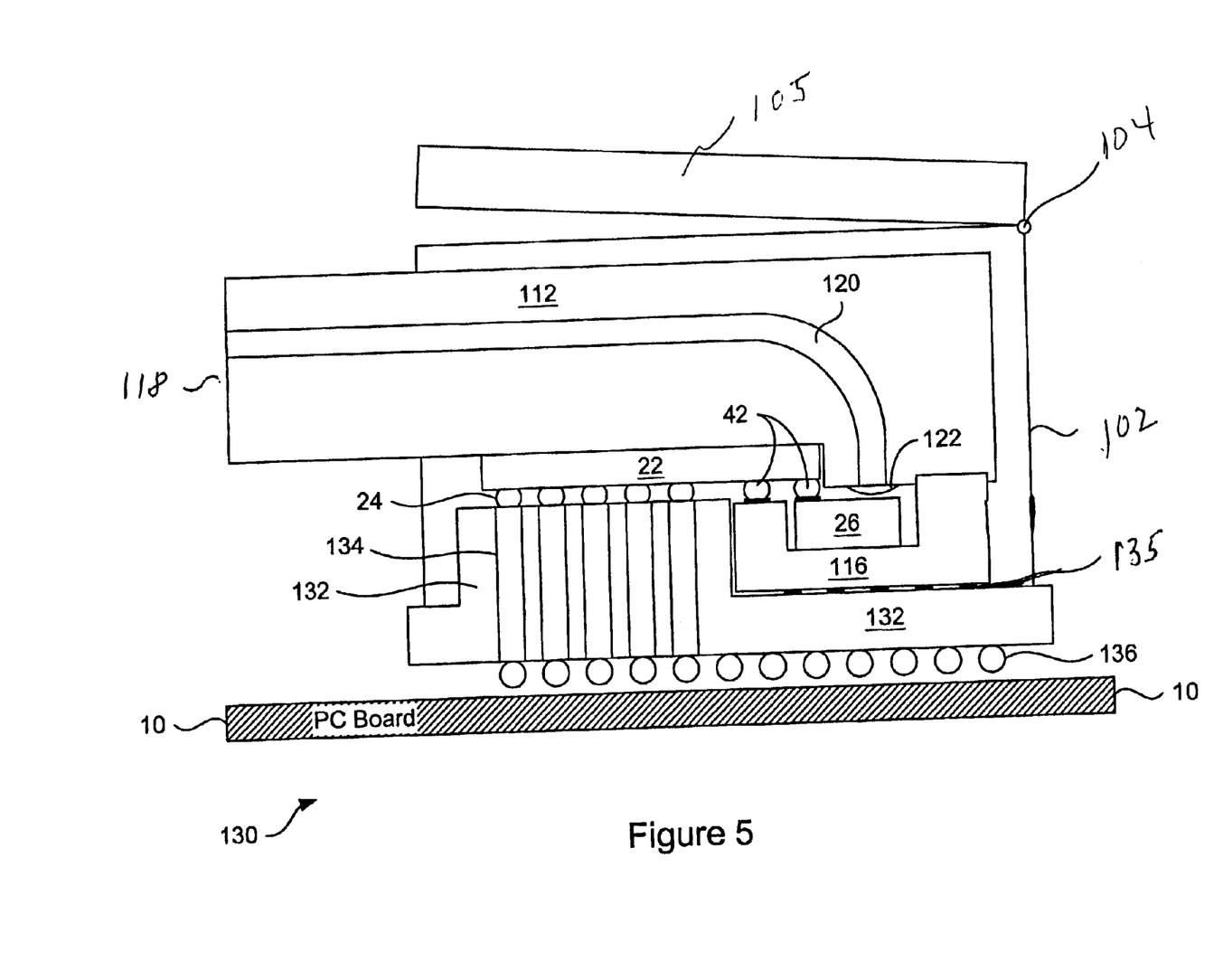
FIG. 5 is a cross section of another electro-mechanical package which uses a socket to connect an opto-electronic, fiber optic cable to a PC board according to another embodiment of the invention.

Referring to FIG. 5, another electro-optical package 130 is shown. As with FIG. 4, all optical and electronic functions are housed within the package 130 where the fiber optic cable 120 terminates. The package 130 houses the entire fiber optic assembly 112 including the upper assembly 118 and the lower assembly 116. The package 130 is thus considered a socket, as opposed to a receptacle, because the entire package 130 is attached to the printed circuit board 10 using solder balls 136. Electrical connections 134 between the chip 22 and the printed circuit board 10 are made through a multilevel interposer board 132. The electrical connections 134 can include crowns, pogo pins, or the like. The interposer board 132 is thus used to space transform the electrical connections and to address the planer offset between the chip 22 and the backing piece 26. In one embodiment, ground contacts 135 can be provided between the photonic device 26 through the lower assembly 116 and interposer board 132 to the printed circuit board 10. In an alternative embodiment, the ground contacts can be made to the printed circuit board 10 through electrical connections 42, chip 22 and electrical connections 134.

Figure 6:
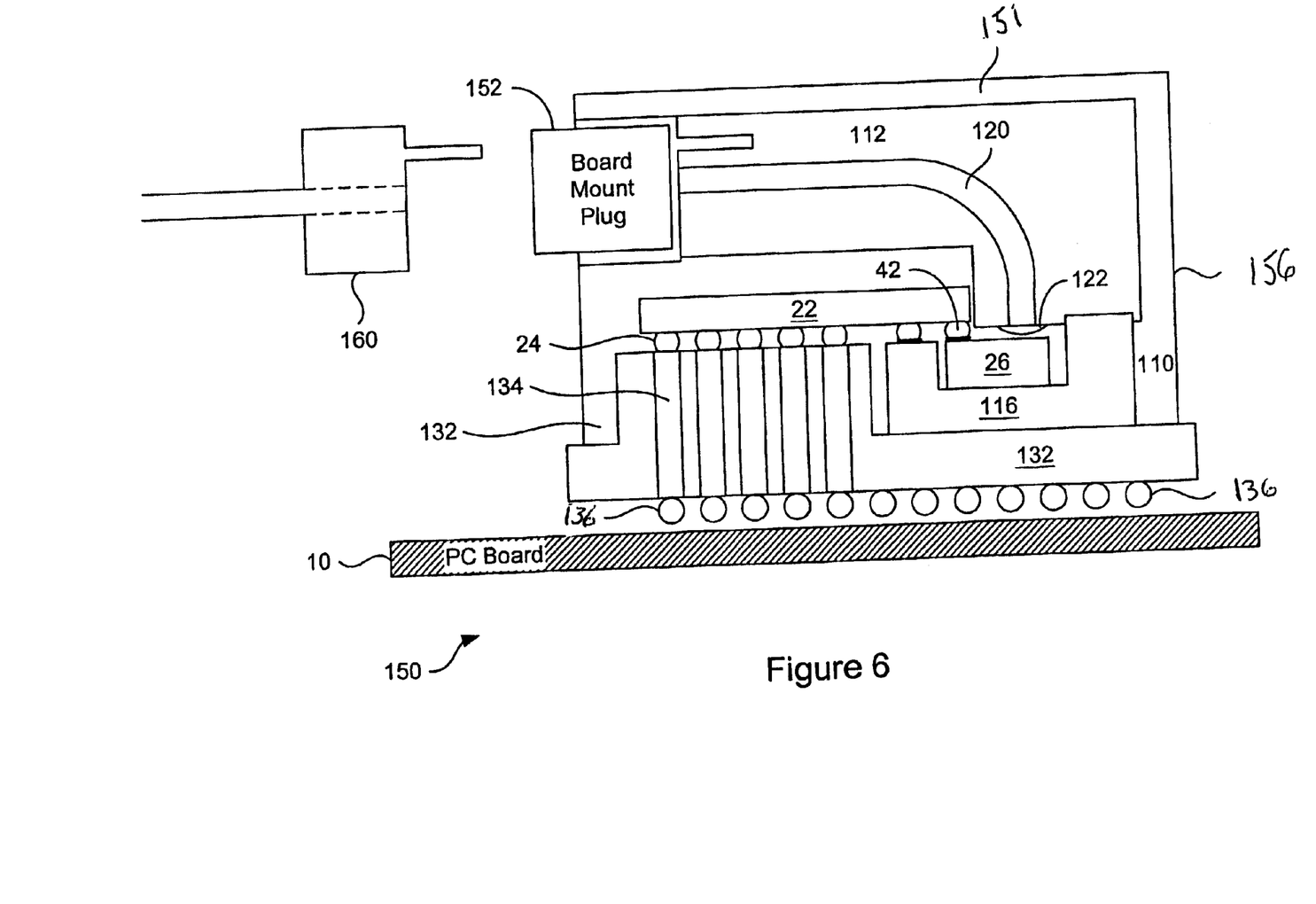
FIG. 6 is a cross section of another electro-mechanical package in which a multilevel interposer board is used to facilitate flip chip attach between IC and photonic devices and to facilitate alignment of the fiber optic and lenses to the photonics.

Referring to FIG. 6, yet another opto-electric package is shown. This package 150 is similar to package 130 of FIG. 5 with several differences. The package 150 has a top surface 151 that is not hinged. This means that all the optical and electrical components are housed within the package 150 as an integrated unit. A board mounting plug 152 is therefore provided to protect sensitive optical components during required board mount operations.

According to one embodiment, the package 150 is manufactured by precision bonding and aligning the opto-electric device 26 onto sub-assembly 116. The IC chip 22 is then flip chip mounted onto the interposer board 132 forming the electrical contacts at locations 24 and 42. Next, the optical assembly 112, with fiber radius bend fiber optic cable 120 and lens area 122 can be precision bonding to the interposer boards 116 using, for example, mechanical support and alignment features, built into the interposer board 116. The entire assembly is then inserted into the receptacle 156. Finally, the top 151 is sealed and the board mount plug 152 inserted. FIG. 6 shows what the completed package 150 after it is soldered with balls 136 to the printed circuit board 10. After installation onto the board 10, the board mount plug 152 can be removed and the fiber optic cabling 160 is inserted.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. An apparatus comprising:
   an integrated circuit;
   a plug-in optical assembly, including:
      a backing piece;
      an opto-electric device mounted onto the backing piece, the backing piece providing an electrical connection between the opto-electric device and a contact location on the backing piece;
   a contact between the contact location on the backing piece and the integrated circuit, and
   a package configured to house the integrated circuit and the plug-in optical assembly, the package including a connector sleeve configured to receive the plug-in optical assembly.

2. The apparatus of claim 1, wherein the contact comprises one of the following types of contacts: a wire bond, a solder ball, or a micro-spring.

3. The apparatus of claim 1, wherein the integrated circuit is a flip chip.

4. The apparatus of claim 1, wherein the integrated circuit is further coupled to a printed circuit board using second contacts, the second contacts including the following types of contacts: wire bonds, solder balls, or micro-springs.

5. The apparatus of claim 1, wherein the integrated circuit is one of the following types of integrated circuits: a receiver, a transmitter, or a transceiver.

6. The apparatus of claim 1, wherein the opto-electric device is one of the following types of opto-electric devices: a photodetector for converting optical signals into electric signals, a laser diode for converting electrical signals into light signals, or both.

7. The apparatus of claim 1, wherein the opto-electric device is mounted onto the backing piece in a first orientation and the contact location is provided on the backing piece at a second orientation perpendicular to the first orientation.

8. The apparatus of claim 1, wherein the package further comprises a heat dissipating fins.

9. The apparatus of claim 1, wherein the package further comprises a top shield that is configured to be mounted onto a printed circuit board.

10. The apparatus of claim 9, wherein the integrated circuit is further configured to be mounted onto the top shield in such a way as to be in electrical contact with the printed circuit board when the top shield is mounted onto the printed circuit board.

11. The apparatus of claim 9, wherein the top shield further comprises an alignment pin configured to align the backing piece with respect to the integrated circuit.

12. The apparatus of claim 1, wherein the optical connector sleeve is further configured to be mounted onto a printed circuit board, such that connections to the electrical sub-assembly are made through a hole in the PC board.

13. The apparatus of claim 12, wherein the optical assembly further comprises a fiber optic ribbon cable and a ferrule.

14. The apparatus of claim 1, wherein the optical assembly is configured to snap into the connector sleeve.

15. An electro-optical package comprising:
   an integrated circuit having an active surface facing in a first direction and positioned at a first location;
   a opto-electric device having a contact point facing in a second direction opposite the first direction and positioned in a second position with respect to the first position of the integrated circuit such that a direct electrical contact can be formed between contact points on the integrated circuit and contact points on the opto-electrical device.

16. The package of claim 15, further comprising a backing piece for mounting the opto-electrical device.

17. The package of claim 15, further comprising a housing, the integrated circuit being mounted to the housing.

18. The package of claim 15, wherein the package is further configured to house a second backing piece with an embedded wave guide that terminates at a lens array.

19. The package of claim 17, wherein the lens array is positioned adjacent the opto-electric device within the package.

20. The package of claim 15, wherein the contact includes the following types of contacts: wire bonds, solder balls, or micro-springs.

21. The package of claim 15, wherein the integrated circuit is further configured to be electrically coupled to a printed circuit board when the package is mounted to the printed circuit board through second contacts.

22. The package of claim 21, wherein the second contacts include "pogo" pins.

23. The package of claim 15, further comprising an interposer board to align and mount the integrated circuit.

24. The package of claim 15, further comprising an interposer board to align and mount the integrated circuit and the opto-electric device.

25. The package of claim 15, wherein the package further comprises a housing configured to house the integrated circuit and the opto-electric device.

26. The package of claim 25, wherein the housing comprises heat dissipating fins.

27. The package of claim 25, wherein the housing is made of one of the following materials: metal, ceramic, epoxy, or plastic.

28. The package of claim 25, wherein the housing further comprises a hinged top section.

29. The package of claim 15, wherein the integrated circuit is one of the following types of integrated circuits: a receiver, a transmitter, or a transceiver.

30. The package of claim 15, wherein the opto-electric device is one of the following types of opto-electric devices: a photodetector for converting optical signals into electric signals, a laser diode for converting electrical signals into light signals, or both.

* * * * *

UNITED STATES PATENT AND TRADEMARK OFFICE
CERTIFICATE OF CORRECTION

PATENT NO. : 6,749,345 B1
DATED : June 15, 2004
INVENTOR(S) : Gee et al.

It is certified that error appears in the above-identified patent and that said Letters Patent is hereby corrected as shown below:

Column 1,
Line 43, add -- within -- after "fiber".

Column 3,
Line 18, change "beat sink" to -- heat sink --.

Signed and Sealed this

Sixteenth Day of November, 2004

JON W. DUDAS
*Director of the United States Patent and Trademark Office*